United States Patent
Guilloux et al.

(10) Patent No.: US 7,413,303 B2
(45) Date of Patent: Aug. 19, 2008

(54) OPHTHALMIC LENS

(75) Inventors: Cyril Guilloux, Paris (FR); Hervé Josso, Le Perreut sur Marne (FR)

(73) Assignee: Essilor International (Compagnie Generale D'Optique), Charenton Cedex ( * ) Notice: Subject to any disclaimer, the term of this patent is extended or adjusted under 35 U.S.C. 154(b) by 313 days.

(21) Appl. No.: 11/449,150

(22) Filed: Jun. 8, 2006

(65) Prior Publication Data

US 2007/0008489 A1    Jan. 11, 2007

(30) Foreign Application Priority Data

Jul. 11, 2005    (FR) .................................. 05 07378

(51) Int. Cl.
*G02C 7/06* (2006.01)
(52) U.S. Cl. ...................... 351/169; 351/177
(58) Field of Classification Search ................ 351/159, 351/169, 177
See application file for complete search history.

(56) References Cited

U.S. PATENT DOCUMENTS

| | | | |
|---|---|---|---|
| 4,307,945 A * | 12/1981 | Kitchen et al. .............. 351/169 |
| 4,854,689 A | 8/1989 | Dufour et al. | |
| 5,270,745 A | 12/1993 | Pedrono | |
| 5,272,495 A | 12/1993 | Pedrono | |
| 5,488,442 A | 1/1996 | Harsigny et al. | |
| 5,812,238 A | 9/1998 | Ahsbahs et al. | |
| 5,949,519 A | 9/1999 | Le Saux et al. | |
| 6,102,544 A | 8/2000 | Baudart et al. | |
| 6,116,734 A | 9/2000 | Pedrono et al. | |
| 6,260,967 B1 | 7/2001 | Edwards et al. | |
| 6,318,859 B1 | 11/2001 | Baudart et al. | |
| 6,382,789 B1 | 5/2002 | Baudart et al. | |
| 6,540,354 B2 | 4/2003 | Chauveau et al. | |

(Continued)

FOREIGN PATENT DOCUMENTS

EP    0 990 939    4/2000

(Continued)

OTHER PUBLICATIONS

W.N. Charman et al., "Astigmatism, accommodation, and visual instrumentation", *Applied Optics*, vol. 17, No. 24, pp. 3903-3910 (Dec. 15, 1978).

(Continued)

*Primary Examiner*—Scott J Sugarman
(74) *Attorney, Agent, or Firm*—Fish & Richardson P.C.

(57) ABSTRACT

An ophthalmic lens has a complex surface with a fitting cross, a progression meridian having a power addition greater than or equal to 1.5 diopters between far vision and near vision reference points. The complex surface has within a circle of radius 20 mm centered on the geometrical center of the lens, a cylinder value normalized to the addition of less than 0.8, and a rebound of the sphere quantity normalized to the addition of less than 0.04 on said circle. The surface also has a progression length less than or equal to 14 mm, defined as the vertical distance between the fitting cross and the point on the meridian for which the mean sphere reaches 85% of the addition.

The lens is suited to hypermetropic wearers with a good perceptual comfort in peripheral vision and good accessibility in near vision.

9 Claims, 10 Drawing Sheets

U.S. PATENT DOCUMENTS

| | | |
|---|---|---|
| 6,595,637 B2 | 7/2003 | Ahsbahs et al. |
| 6,595,638 B2 | 7/2003 | Ahsbahs et al. |
| 6,652,096 B1 | 11/2003 | Morris et al. |
| 6,682,194 B2 | 1/2004 | Ahsbahs et al. |
| 6,793,340 B1 | 9/2004 | Morris et al. |
| 2002/0171803 A1 | 11/2002 | Ahsbahs et al. |
| 2002/0176048 A1 | 11/2002 | Ahsbahs et al. |
| 2002/0180928 A1 | 12/2002 | Ahsbahs et al. |
| 2003/0156251 A1 | 8/2003 | Welk et al. |

FOREIGN PATENT DOCUMENTS

| | | |
|---|---|---|
| FR | 2 588 973 | 4/1987 |
| FR | 2 683 642 | 5/1993 |
| FR | 2 699 294 | 6/1994 |
| FR | 2 704 327 | 10/1994 |
| FR | 2 753 805 | 3/1998 |
| FR | 2 769 997 | 4/1999 |
| FR | 2 769 998 | 4/1999 |
| FR | 2 769 999 | 4/1999 |
| FR | 2 770 000 | 4/1999 |
| FR | 2 809 193 | 11/2001 |
| FR | 2 820 515 | 8/2002 |
| FR | 2 820 516 | 8/2002 |
| GB | 2 277 997 | 11/1994 |
| WO | WO 98/12590 | 3/1998 |
| WO | WO 03/048841 | 6/2003 |

OTHER PUBLICATIONS

Rainer G. Dorsch et al., "Coma and Design Characteristics of Progressive Addition Lenses", *Vision Science and Its Applications*, Technical Digest Series vol. 1, Santa Fe, New Mexico pp. SaA3-1 / 68-SaA3-4 / 71(Feb. 6-9, 1998).

Eloy A. Villegas et al., "Spatially Resolved Wavefront Aberrations of Ophthalmic Progressive-Power Lenses in Normal Viewing Conditions", *Optometry and Vision Science*, vol. 80, No. 2, pp. 106-114 (Feb. 2003).

\* cited by examiner

OPHTHALMIC LENS

CROSS REFERENCE TO RELATED APPLICATIONS

Pursuant to U.S.C. § 119, this application claims the benefit of French Patent Application 05 07 378, filed Jul. 11, 2005. The contents of the prior application is incorporated herein by reference in its entirety.

TECHNICAL FIELD

This invention relates to an ophthalmic lens.

BACKGROUND

Any ophthalmic lens intended to be held in a frame involves a prescription. The ophthalmic prescription can include a positive or negative power prescription as well as an astigmatism prescription. These prescriptions correspond to corrections enabling the wearer of the lenses to correct defects of his vision. A lens is fitted in the frame in accordance with the prescription and with the position of the wearer's eyes relative to the frame.

In the simplest cases, the prescription is nothing more than a power prescription. The lens is said to be unifocal and has a rotational symmetry. It is fitted in a simple manner in the frame so that the principal viewing direction of the wearer coincides with the axis of symmetry of the lens.

For presbyopic wearers, the value of the power correction is different for far vision and near vision, due to the difficulties of accommodation in near vision. The prescription thus comprises a far vision power value and an addition (or power progression) representing the power increment between far vision and near vision; this comes down to a far vision power prescription and a near vision power prescription. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or also FR-A-2 704 327. Progressive multifocal ophthalmic lenses include a far vision zone, a near vision zone and an intermediate-vision zone, a principal progression meridian crossing these three zones. They are generally determined by optimization, based on a certain number of constraints imposed on the different characteristics of the lens. These lenses are all-purpose lenses in that they are adapted to the different needs of the wearer at the time.

For young presbyopics, lenses have been proposed which do not have a far vision zone with a reference point, unlike standard progressive multifocal lenses; these lenses are described in FR-A-2 588 973. These lenses are prescribed only according to with the power required by the wearer in near vision, regardless of the power required by the wearer in far vision. The lens has a central part which has an additional spherical power offering the wearer satisfactory near vision. It also has a slight decrease in power in the upper part, which ensures the wearer clear vision even beyond the normal near vision field. Finally, the lens has a point with a power value equal to the nominal near vision power, a higher-power zone in the lower part of the lens and a lower-power zone in the upper part of the lens.

FR-A-2 769 997 proposes a lens which, compared with a standard progressive multifocal lens, has a stabilized and larger near vision zone, a significant increase in the field widths in near vision and intermediate vision, as well as a reduction in aberrations and in particular in astigmatism. It ensures a suitable correction for distances between 40 and 80 cm and, in most cases, for distances between 40 cm and 2 m. This lens is actually a near vision—intermediate-vision mid-distance lens, favouring near vision while ensuring clear vision beyond the normal near vision field. On the other hand, no far vision is available. This lens proves particularly well suited to computer work. It is prescribed for young presbyopics, solely according to the prescription for near vision. The rear face of the lens is machined in order to ensure a near vision power matching the prescription, without taking account of the far vision prescription. Two front faces are sufficient to meet all of the wearer's needs.

FR-A-2 769 999 proposes a progressive multifocal ophthalmic lens having improved comfort of vision with a monotone sphere variation as a function of the angle on a circle of radius 20 mm centred on the geometrical centre of the lens on either side of the meridian. This lens ensures unimpeded far vision covering an angular sector originating at the geometrical centre of the lens and having an angle at the centre greater than 150°.

Multifocal lenses, whether they are progressive or intended purely for near vision, can include a complex multifocal face (i.e. allowing no axis of rotation, typically a surface having a power progression), for example the face away from the person wearing the glasses, and a spherical or toric face, called the prescription face. This spherical or toric face allows the lens to be adapted to the user's ametropia, so that a multifocal lens is generally defined only by its complex surface. For a given product different complex faces are defined in accordance with the addition and the base (or mean far vision sphere). Starting from semi-finished lenses, of which only the multifocal face is formed, it is possible to prepare lenses suited to each wearer, by simple machining of a spherical or toric prescription face.

Independently of the power prescription, a wearer may be given an astigmatism prescription. Such a prescription is produced by the ophthalmologist, in the case of far vision, in the form of a pair formed by an axis value (in degrees) and an amplitude value (in diopters). On a surface, the amplitude value represents the difference $1/R_1 - 1/R_2$ between the principal curvatures; the axis value represents the orientation, relative to a reference axis and in a conventional direction of rotation, of the maximum curvature $1/R_1$.

In prescription terms, the amplitude value represents the difference between the minimum and maximum powers in a given direction and the axis represents the orientation of the maximum power. The term astigmatism is used for the pair (amplitude, angle); this term is also sometimes used, although this is linguistically incorrect, to designate the amplitude of the astigmatism. The context allows a person skilled in the art to understand which meaning is intended.

SUMMARY

The invention proposes a lens which is easier to adapt to than the standard ophthalmic lenses; it allows the wearer to be offered a high degree of comfort of vision for excellent perception in peripheral vision by limiting the cylinder values while ensuring good accessibility to the powers required in near vision. Such a lens is particularly adapted to the comfort of vision of hypermetropic wearers.

The invention thus proposes an ophthalmic lens having a complex surface with a geometrical centre, a fitting cross situated 4 mm above the geometrical centre and a substantially umbilical progression meridian having a power addition greater than or equal to 1.5 diopters between a far vision reference point and a near vision reference point, the complex surface having:

a cylinder value normalized to the addition of less than 0.8 in a circle of radius 20 mm centred on the geometrical centre of the lens;

a rebound in the sphere quantity normalized to the addition on the circle of radius 20 mm centred on the geometrical centre of the lens of less than 0.04;

a progression length less than or equal to 14 mm, the progression length being defined as the vertical distance between the fitting cross and the point of the meridian at which the mean sphere reaches 85% of the progression of the addition.

The invention also relates to a visual device comprising at least one such lens and a method for correcting the vision of a presbyopic subject, which comprises providing the subject with, or the wearing by the subject of, such a device.

DESCRIPTION OF DRAWINGS

Other advantages and characteristics of the invention will become apparent on reading the following description of the embodiments of the invention, given by way of example and with reference to the drawings which show.

DETAILED DESCRIPTION

In the following description, for the sake of simplicity of the disclosure, the case of a lens having one complex surface and one spherical or toric surface is considered. The complex face of the lens can be the front face (away from the wearer), as is the case for progressive multifocal lenses of the state of the art. Lenses with a radius of 30 mm are considered.

In a manner known per se, at any point of a complex surface, a mean sphere D given by the formula:

$$D = \frac{n-1}{2}\left(\frac{1}{R_1} + \frac{1}{R_2}\right)$$

is defined, where $R_1$ and $R_2$ are the local maximum and minimum radii of curvature expressed in meters, and n is the index of the material constituting the lens.

A cylinder C, given by the formula:

$$C = (n-1)\left|\frac{1}{R_1} - \frac{1}{R_2}\right|$$

is also defined.

The characteristics of the complex face of the lens can be expressed using the mean sphere and the cylinder.

The invention proposes a progressive multifocal ophthalmic lens having the advantages of a high level of comfort of vision for excellent perception in peripheral vision, and also a good accessibility in near vision. The lens makes it possible to improve the peripheral vision by limiting the cylinder variations in the peripheral zones of the meridian. The proposed lens also ensures a good accessibility to the powers required in near vision, allowing the wearer to see satisfactorily at distances equal to approximately 40 cm without obliging him to lower his eyes very much, the near vision zone being accessible from 14 mm below the fitting cross. The lens is thus a lens particularly suitable for hypernetropic wearers who are particularly sensitive to peripheral distortions. The lens has a prescription such that the powers prescribed for the wearer in far vision and in near vision are achieved on the lens.

Figure 1:
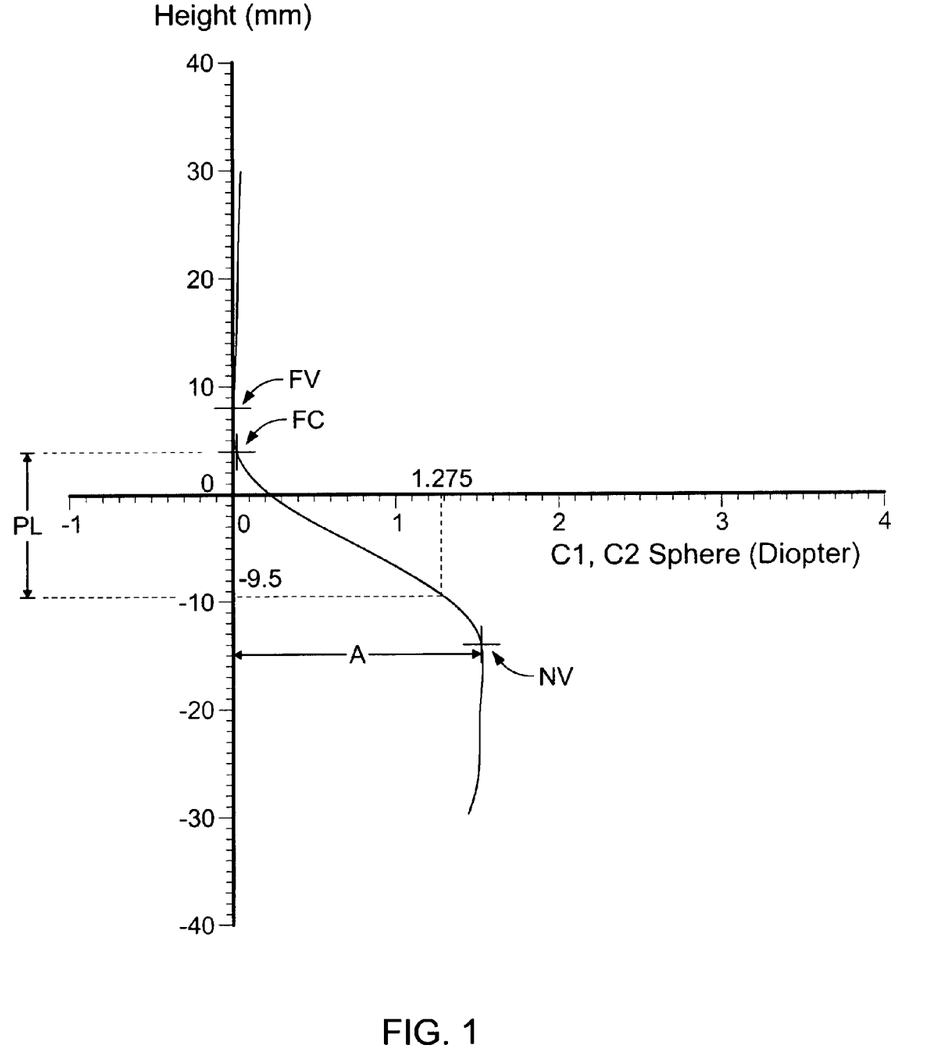
FIG. 1, a diagram of the principal curvatures and the sphere on the meridian of a lens according to a first embodiment of the invention.
Figure 2:
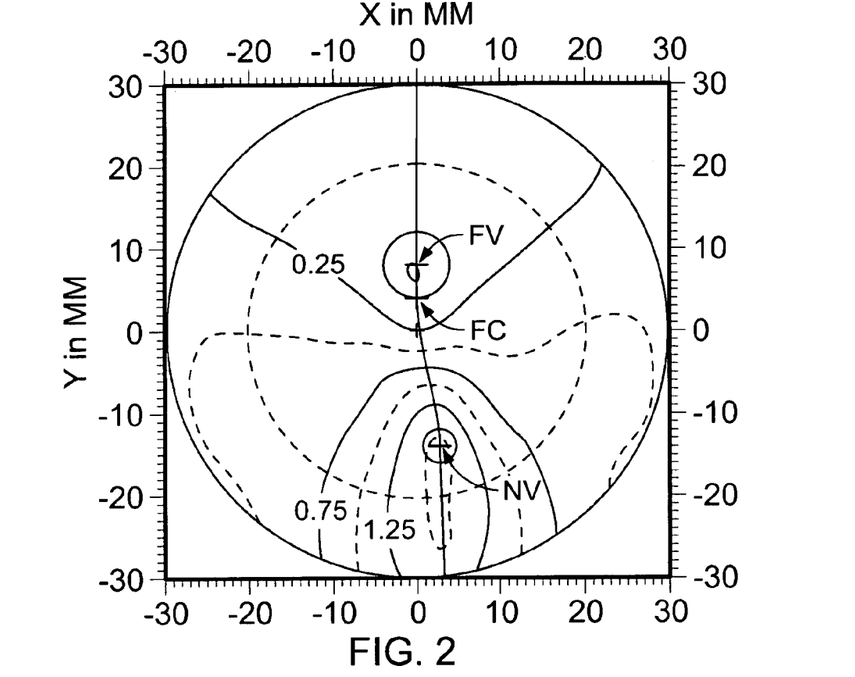
FIG. 2, a mean-sphere map of the lens of FIG. 1.
Figure 3:
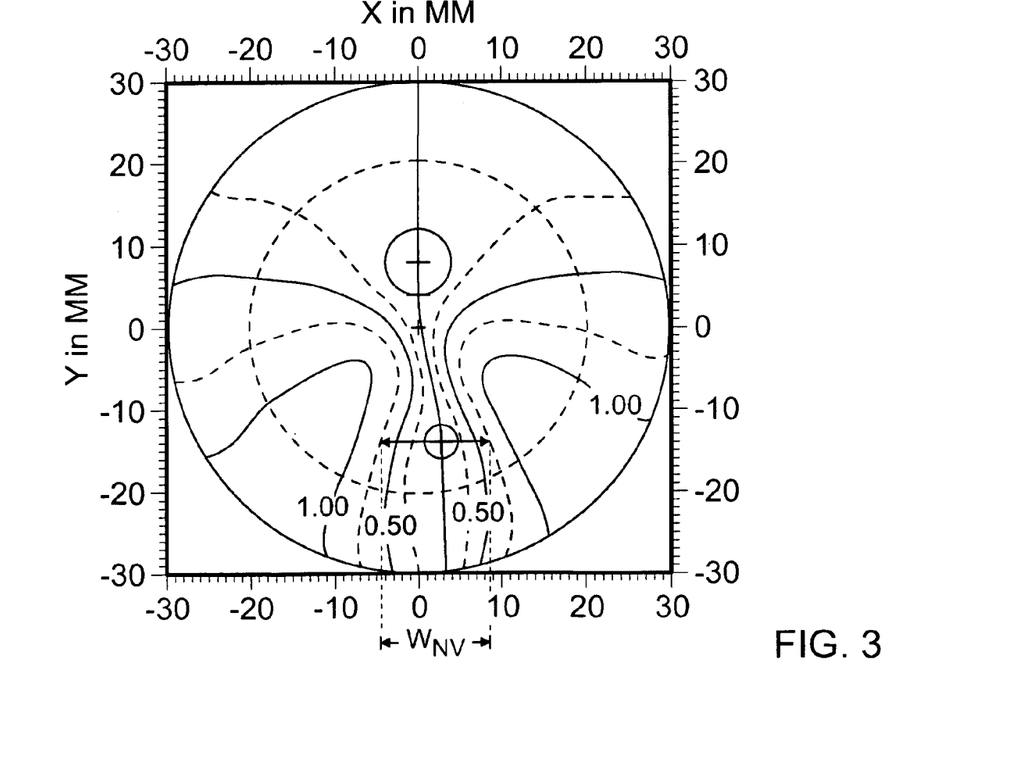
FIG. 3, a cylinder map of the lens of FIG. 1.
Figure 10:
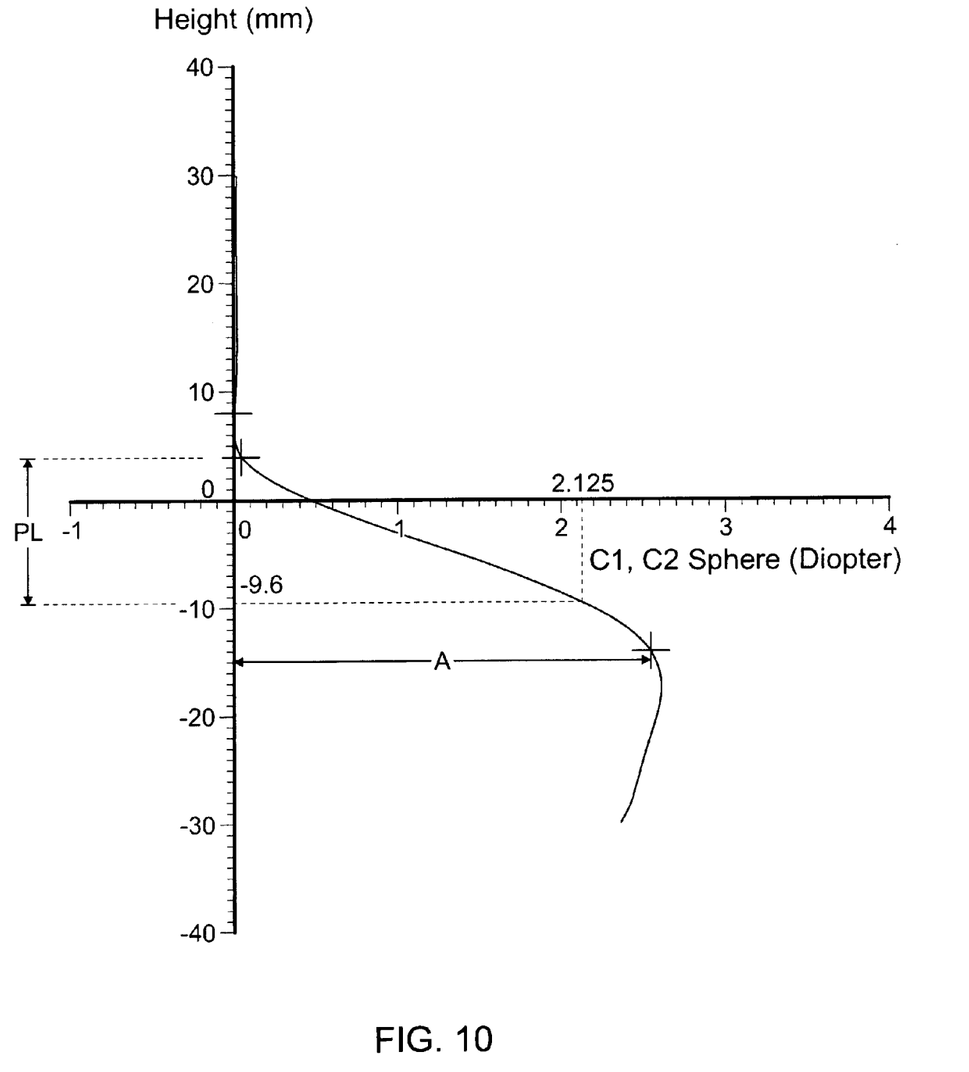
FIGS. 10 to 12, figures similar to FIGS. 1 to 3, for a lens according to a fourth embodiment of the invention.
Figure 11:
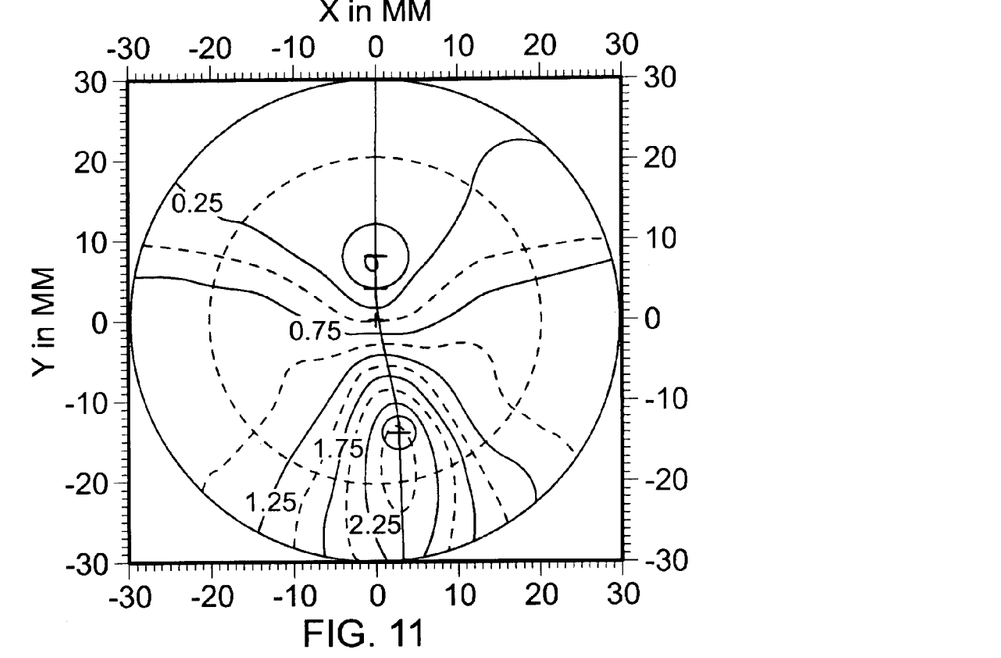
Figure 12:
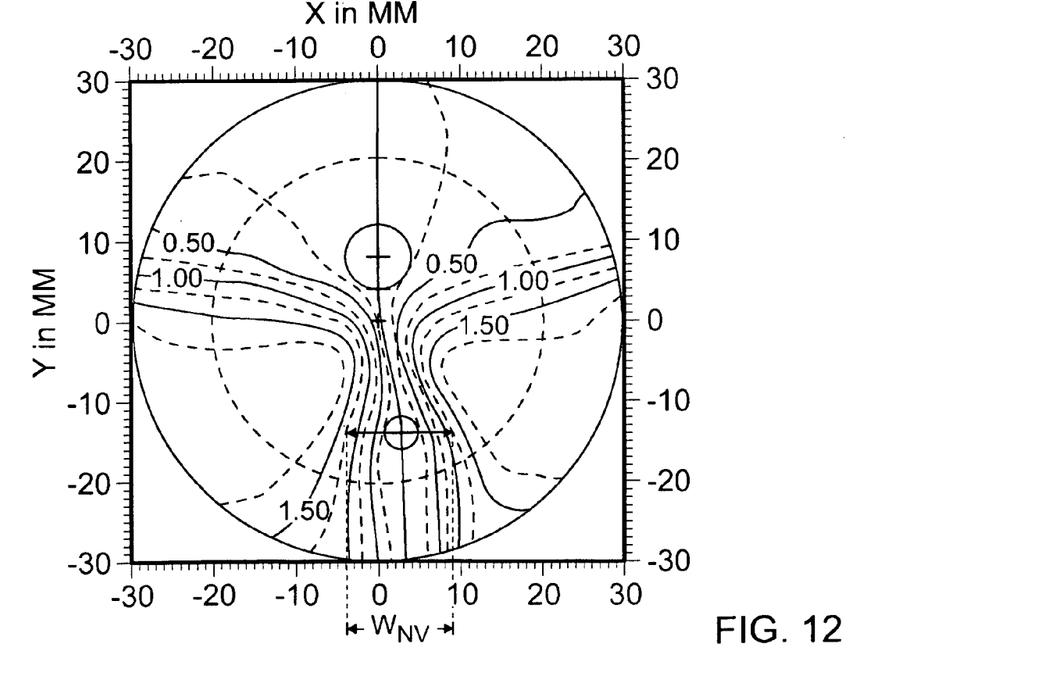

The lens is described in the following with reference to four embodiments. The lens of the first embodiment, represented in FIGS. 1 to 3, is suitable for presbyopic hypernetropic wearers who have a prescription for a 1.5 diopter power progression. The lenses of the second and third embodiments, represented in FIGS. 4 to 6, and 7 to 9, are suitable for presbyopic hypermetropic wearers who have a prescription for a power progression equal to two diopters. The lens of the second embodiment (FIGS. 4 to 6), takes into account the conditions when being worn (aspherization causing cylinder construction to be apparent) in surface modelling, while the lens of the third embodiment, (FIGS. 7 to 9), does not take these into account. The lens of the fourth embodiment, represented in FIGS. 10 to 12, is suitable for presbyopic hypermetropic wearers who have a prescription for a power progression equal to 2.5 diopters.

In the four embodiments described below, the lens has a markedly umbilical line, called a meridian, on which the cylinder is practically nil. The meridian coincides with the vertical axis in the upper part of the lens and has an inclination on the nose side in the lower part of the lens, the convergence being more marked in near vision.

FIG. 1 shows a diagram of the principal curvatures and of the sphere on the meridian of a lens according to a first embodiment of the invention. The points on the complex surface of the lens are plotted in FIG. 1 and in FIGS. 2 and 3 with reference to an orthonormalized reference point, originating in the geometrical centre (0, 0) and the ordinates axis of which is vertical and the abscissa axis of which is horizontal. In FIG. 1 the curvature or the sphere is plotted on the abscissa axis in diopters; the position on the lens meridian is marked on the ordinates axis in millimeters. FIG. 1 shows, on the ordinate y=8 mm, a far vision reference point FV and, on the ordinate y=−14 mm, a near vision reference point NV. The figure also shows, on the ordinate y=4 mm, a reference point called the fitting cross FC of the lens; this is a centring point produced on the lens which is used by the optician to fit the lens in the frame. The fitting cross can be marked by a point produced on the lens, before fitting in the frame, by a cross or any other mark such as a point surrounded by a circle marked on the lens, or by any other appropriate means.

FIG. 1 shows the mean sphere as a solid line and, in broken lines, the principal curvatures $C_1=(n-1)/R_1$ and $C_2=(n-1)/R_2$ on the meridian. The values are reset to zero at the origin, where the mean sphere is actually equal to 6.58 diopters. It is firstly noted that the solid line and the broken lines coincide—representing a cylinder which is nil on the meridian of the lens.

It is then possible to note that the mean sphere on the meridian is substantially constant over the upper half of the lens. More precisely, in the example of FIG. 1, the sphere difference on the meridian, between the fitting cross FC and the far vision reference point FV, is substantially nil, equal to 0.02 diopters, i.e. less than 0.06 diopters. This characteristic ensures that the lens is equivalent to an unifocal lens in its upper part and on the meridian. In other words, the power progression takes place below the fitting cross FC of the lens.

The intermediate vision zone generally begins, for a progressive multifocal lens, at the fitting cross FC, i.e. 4 mm above the geometrical centre of the lens. It is here that the power progression begins. Therefore, the mean sphere increases, from the fitting cross FC to the control point in near vision NV, for values of the ordinate y between 4 mm and −14 mm. For ordinates below y=−14 mm, the mean sphere is substantially constant, with a value of the order of 1.5 diopters equal to the power addition A. The mean-sphere variation on the meridian below the near vision NV control point of the lens is then substantially nil.

It is thus possible to define on the lens a power addition A; this corresponds either to the difference in power between two high FV and low NV reference points respectively for far and near vision, or to a difference between the substantially constant power value in the lower part of the lens, on the meridian, and the substantially constant power value in the upper part of the lens, on the meridian. More generally, the power addition can be defined as the difference between the maximum and minimum power values on the meridian of the lens; this definition also applies to the mean spheres in the example of a lens characterized by a complex surface. In the example of FIG. 1, this value of the power addition between maximum and minimum values is 1.5 diopters. It is also possible to define a progression length, called PL in FIG. 1, which is the vertical distance—or the difference in ordinates—between the fitting cross FC and a point of the meridian at which the power progression reaches 85% of the power addition A. By applying this definition to the lens of FIG. 1, a mean sphere of 0.85×1.5 diopters, i.e. 1.275 diopters, is obtained for an ordinate point y of approximately −9.7 mm. The progression length PL, between the fitting cross FC of ordinate y=4 mm and that point on the meridian at which the mean sphere reaches 85% of the addition, is equal to 13.5 mm. The accessibility to the powers required in near vision is therefore less than 14 mm.

A maximum slope of the sphere variation normalized to the addition is also defined as the maximum of the absolute value of the sphere variation along the meridian divided by the addition. In the example of FIG. 1, by applying this definition to a lens characterized by a complex surface, the maximum slope of the sphere normalized to the addition along the meridian is 0.084 mm$^{-1}$. The slope of the sphere variation on the meridian is therefore fairly steep, exceeding 0.07 mm$^{-1}$; the power values required for near vision are therefore quickly reached with a shortened progression length PL.

FIG. 2 shows a mean-sphere map of the lens of FIG. 1; as is customary, the isosphere lines are plotted in FIG. 2 in an orthonormalized reference; these lines are formed from the points having the same mean sphere value. In FIG. 2 the 0 diopter to 1.5 diopter isosphere lines are represented in 0.25 diopter steps. A 0.25 diopter isosphere line passes through the upper part of the lens, passing close to the geometrical centre (0, 0). The mean-sphere value is therefore substantially constant in the upper part of the lens and around the fitting cross. The virtually nil sphere variation around the fitting cross allows a certain tolerance of positioning when fitting the lens in the visual device, as will be explained below. The 0.5 diopter isosphere line extends more or less horizontally between the ordinates −3 mm and 1 mm. The 0.75 to 1.5 diopter isosphere lines are marked on the figure and extend into the lower part of the lens, around the meridian.

Figure 13:
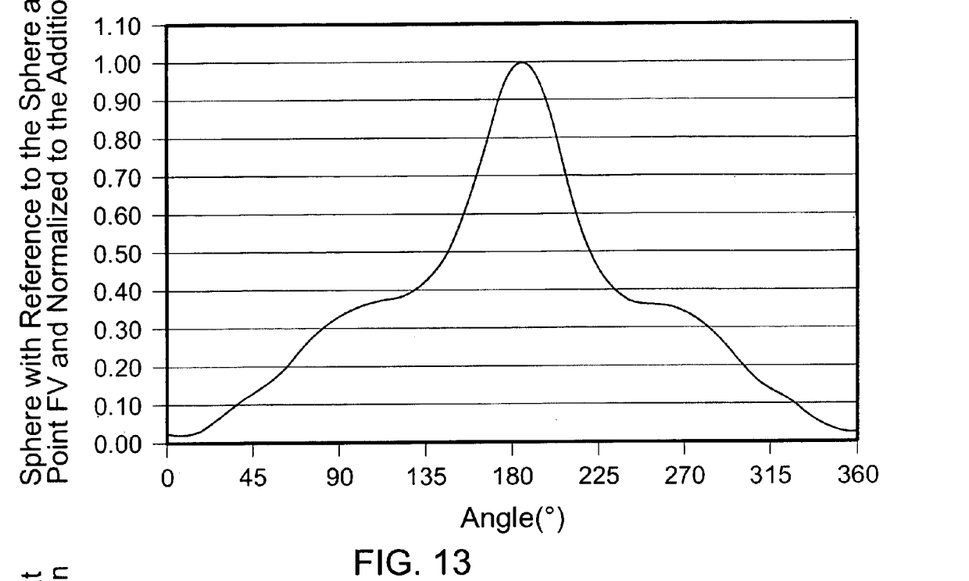
FIGS. 13 to 16, graphical representations of the values of the sphere with reference to the sphere in far vision, all normalized to the addition, on a circle of diameter 40 cm centred on the geometrical centre of the lens, as a function of the angle, respectively for the lenses of FIGS. 1, 4, 7 and 10.

In FIG. 2, a circle of radius 20 mm centred on the geometrical centre (0, 0) of the lens is also represented. In order to give the wearer maximum comfort of vision, it is sought to control the sphere variations along this circle; the wearer's peripheral vision is thus improved. In the present case, control of the sphere variations along this circle implies a limitation of the rebound of the sphere quantity normalized to the addition. In particular the rebound of the variation of the sphere value along this circle, divided by the value of the addition A, is less than 0.04. The rebound of the sphere quantity normalized to the addition is defined as the difference in the sphere value normalized to the addition between two local extremums situated between the absolute maximum and the absolute minimum. FIG. 13, which will be discussed in more detail below, represents a graph of the sphere variation normalized to the addition along said circle of diameter 40 mm for the lens of FIG. 1.

FIG. 3 shows a cylinder map of the lens of FIG. 1. The 0.25 diopters to 1 diopter isocylinder lines are represented in the figure in steps of 0.25 diopter. It is noted that in the lower part of the lens, the isocylinder lines are virtually parallel and vertical and delimit a zone containing the near vision reference point NV.

In FIG. 3, the circle of radius 20 mm centred on the geometrical centre (0, 0) of the lens has also been represented. In order to ensure a high level of visual comfort to the wearer, it is also sought to control the cylinder variations inside this circle; the peripheral vision of the wearer is thus improved. In particular, the maximum cylinder value normalized to the addition C/A is equal to 0.78 in this circle of radius 20 mm centred on the geometrical centre of the lens, i.e. less than 0.8.

The invention also proposes to introduce a constraint on the positions of the isocylinder lines equal to one half of the prescribed addition A/2 in the lower part of the lens. In fact, the cylinder is representative of the difference between the local surface and a spherical surface; it is advantageous that it remains low in the zone of the lens used for vision, which in geometrical terms amounts to "opening" or "expanding" the isocylinder lines of the meridian.

At the near vision reference point NV, a horizontal width $W_{NV}$ is measured between the isocylinder lines of value A/2 which correspond to the width of the near vision zone. This width $W_{NV}$ is the difference between the abscissas x of the two points of the two isocylinder lines A/2 the ordinate of which is 18 mm less than that of the fitting cross FC.

According to the invention, the complex surface of the lens has a near vision zone width $W_{NV}$ of between 11 mm and 15 mm, which corresponds to a very clear near vision zone. In the example of FIG. 3, the lens has a near vision width $W_{NV}$ equal to 13.11 mm.

The invention thus proposes to use a criterion of near vision relative width $RW_{NV}$, which takes into account the relative addition on the meridian $A_{NV}$, the width of the near vision zone $W_{NV}$ (horizontal width at the isocylinder A/2) and the maximum value of the cylinder $C_{NV}$ outside the near vision zone. This criterion of relative width is defined at a given ordinate at 18 mm below the fitting cross FC. In the examples, this ordinate corresponds to a near vision reference point NV.

The relative addition $A_{NV}$ is defined as the difference between the mean sphere on the principal meridian of progression at the near vision reference point NV and the fitting cross FC.

The maximum cylinder $C_{NV}$ may also be measured on a horizontal segment comprising all the ordinate points y=−14 mm (18 mm below the fitting cross) from which the distance to the geometrical centre is less than 20 mm; in terms of abscissas, the points are thus considered where the abscissa x is of a modulus less than $\sqrt{(20^2-14^2)}=14.3$ mm. In other words, the maximum cylinder is considered, at 18 mm below the fitting cross, over the whole width of the lens, even beyond the limit of the near vision zone.

The relative width in near vision $RW_{NV}$ is therefore defined as follows:

$$RW_{NV} = W_{NV}(A_{NV}/C_{NV})$$

This relative width represents not only the width of the near vision zone $W_{NV}$, but also the visual comfort of the lens outside this, at 18 mm below the fitting cross FC.

According to the invention, the near vision zone is defined such as to maximize the value of the near vision relative width $RW_{NV}$; advantageously, it is greater than a value of the order of 15 mm, for all additions. The isocylinders A/2 are determined without the near vision zone in order to satisfy this condition. In the example in FIG. 3, the near vision relative width $RW_{NV}$ is equal to 17.12 mm.

The invention also proposes to minimize, at each useful point of the lens, the product of the slope of the sphere by the cylinder. This quantity is representative of the aberrations of the lens: it is obviously nil for a spherical lens. The slope of the sphere is representative of the local variations of the sphere: the lower it is, the more "gentle" the lens is, i.e. the lens has a progression which is not too abrupt. It is however necessary, in order to ensure a progression, that the slope of the sphere does not have nil values over the whole of the lens, and in particular over the principal progression meridian.

The product of the slope of the sphere by the cylinder represents a balance between control of the slopes of the sphere and the desire to enlarge the isocylinder lines. For a lens in which the maximum slope of the sphere is located on the meridian and in which the meridian is an umbilical line, the product would be nil on the meridian, and would have a low value around the latter. On becoming more distant from the meridian, the cylinder values may increase, but the product may remain low if the slope of the sphere is itself low: this is preferable in the zones remote from the meridian, as the sphere progression is in fact only functional in the corridor of progression around the meridian. In other words, to impose a limit on the product of the slope of the sphere by the cylinder on the surface of the lens involves minimizing the cylinder in the foveal region, while minimizing the slope of the sphere in the extrafoveal region. This ensures both good foveal vision and good peripheral vision. The product of the slope of the sphere by the cylinder is therefore a quantity representative of the aberrations on the surface of the lens.

The invention proposes to minimize this product on the surface of the lens inside a circle of radius 20 mm centred on the geometrical centre of the lens; this results in excluding the zones at the edge of the lens, which are used very little or not at all by the wearer, particularly in the case of frames of small dimensions.

To this end, the invention proposes to introduce the criterion of a ratio between on the one hand the integral of the product of the cylinder by the norm of the sphere gradient, on the circle of radius 20 mm centred on the geometrical centre of the lens, and on the other hand, the product of the area of this circle by the addition and by the maximum value of the norm of the sphere gradient on the part of the meridian comprised within this circle. The invention proposes to limit this ratio criterion to a value of less than 0.14. For the lens in FIG. 3, this criterion is equal to 0.11.

Figure 4:
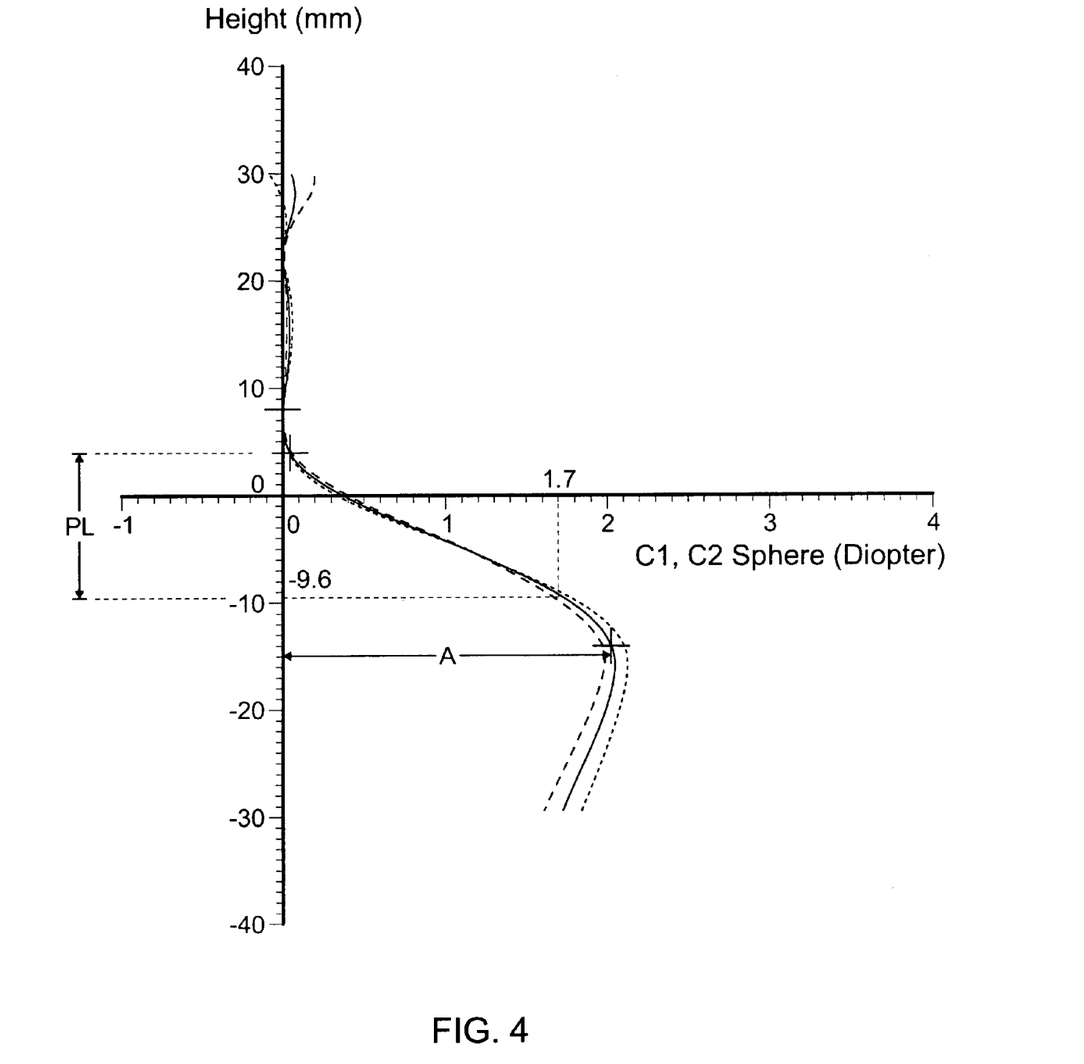
FIGS. 4 to 6, figures similar to FIGS. 1 to 3, for a lens according to a second embodiment of the invention.
Figure 5:
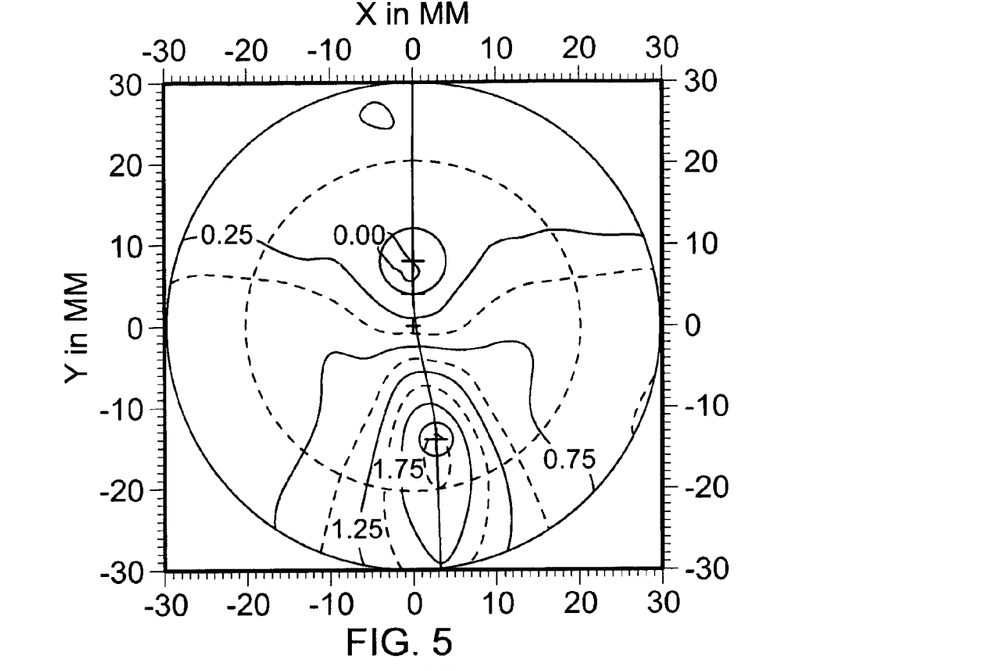
Figure 6:
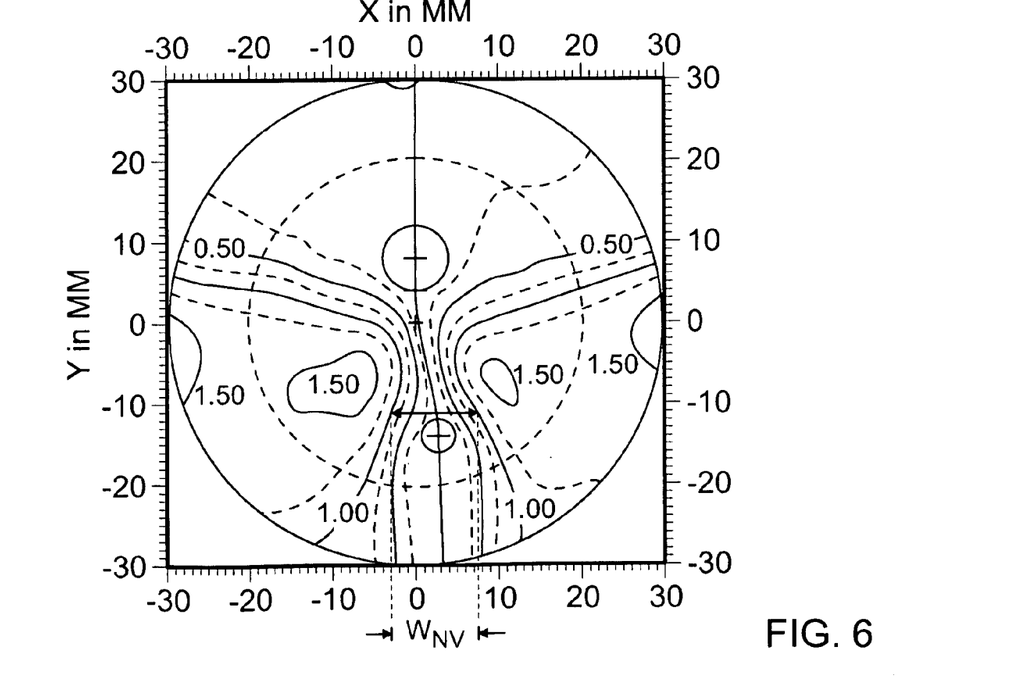

FIGS. 4 to 6 are views similar to those of FIGS. 1 to 3, but for a lens having a power addition of 2 diopters on the complex surface.

FIG. 4 shows the characteristics already demonstrated in FIG. 1, apart from the fact that the mean sphere progression over the meridian is of the order of 2 diopters, not 1.5 diopters. The values are reset to zero at the origin, where the mean sphere value is in fact 6.58 diopters. In particular, in the example in FIG. 4 it is noted firstly that the solid line (the sphere) and the broken lines (the principal curvatures) do not coincide, which is representative of a cylinder with values which are not nil on the meridian of the lens. In fact, in the example in FIG. 4, construction cylinder has been introduced to compensate for optical aberrations generated by the position of the lens when being worn, which may be simulated by ray tracing and analysed for power and astigmatism in wearing conditions.

The mean sphere variation on the meridian in the upper part of the lens, between the fitting cross FC and the far vision reference point FV, is equal to 0.04 diopters, and the mean sphere variation on the meridian below the near vision reference point NV decreases slightly in order to compensate for power variations generated by the actual wearing conditions.

FIG. 4 also shows the progression length PL. In the example in FIG. 4, by application of the definition given with reference to FIG. 1, a mean sphere of 0.85×2 diopters, i.e. 1.70 diopters, is reached for an ordinate point y of approximately −9.6 mm. The progression length PL between the fitting cross FC of ordinate y=4 mm and this point on the meridian for which the mean sphere reaches 85% of the addition, is equal to 13.6 mm. Accessibility of the power values necessary for near vision is therefore less than 14 mm. Furthermore, in the example in FIG. 4, by applying the definition given with reference to FIG. 1, the maximum slope of the sphere variation normalized to the addition is equal to 0.082 mm$^{-1}$. It is therefore greater than 0.07 mm$^{-1}$.

Figure 14:
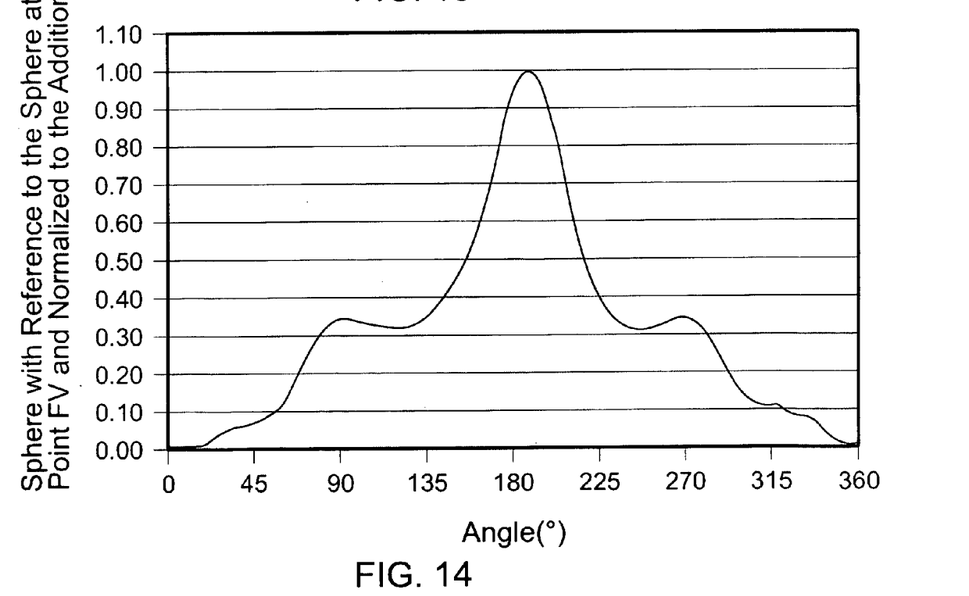

FIG. 5 shows the isosphere lines of 0 to 2 diopters, in steps of 0.25 diopters. As in FIG. 2, a circle of radius 20 mm centred on the geometrical centre of the lens has been represented. The rebound of the sphere value variation along this circle, divided by the value of the addition A, is less than 0.04. FIG. 14, which will be described below, represents a curve of sphere variation normalized to the addition along this circle for this lens having a power addition of 2 diopters on the complex surface.

FIG. 6 shows the isocylinder lines from 0.25 to 1.5 diopters, in steps of 0.25 diopters. As in FIG. 3, it is noted that in the lower part of the lens, the isocylinder lines are virtually parallel and vertical, and delimit a zone containing the near vision reference point NV. Also represented in FIG. 6 is the width of near vision $W_{NV}$; according to the definitions given with reference to FIG. 3, the near vision width $W_{NV}$ is equal to 13.02 mm and the relative near vision width $RW_{NV}$ is equal to 17.72 mm.

Also represented is a circle of radius 20 mm centred in the geometrical centre (0, 0) of the lens, and it is noted that the value of the cylinder normalized to the addition C/A is less than 0.8 in this circle. A maximum value is measured for the cylinder normalized to the addition equal to 0.78.

Furthermore, the lens in FIG. 6 also respect the criterion of a ratio of less than 0.14 for the ratio between on the one hand, the integral of the product of the cylinder by the norm of the sphere gradient, on the circle of radius 20 mm centred on the geometrical centre of the lens, and on the other hand, the product of the area of this circle by the addition and by the maximum value of the norm of the sphere gradient on the part of the meridian comprised within this circle. For the lens in FIG. 6, the value measured for this ratio is 0.12.

Figure 7:
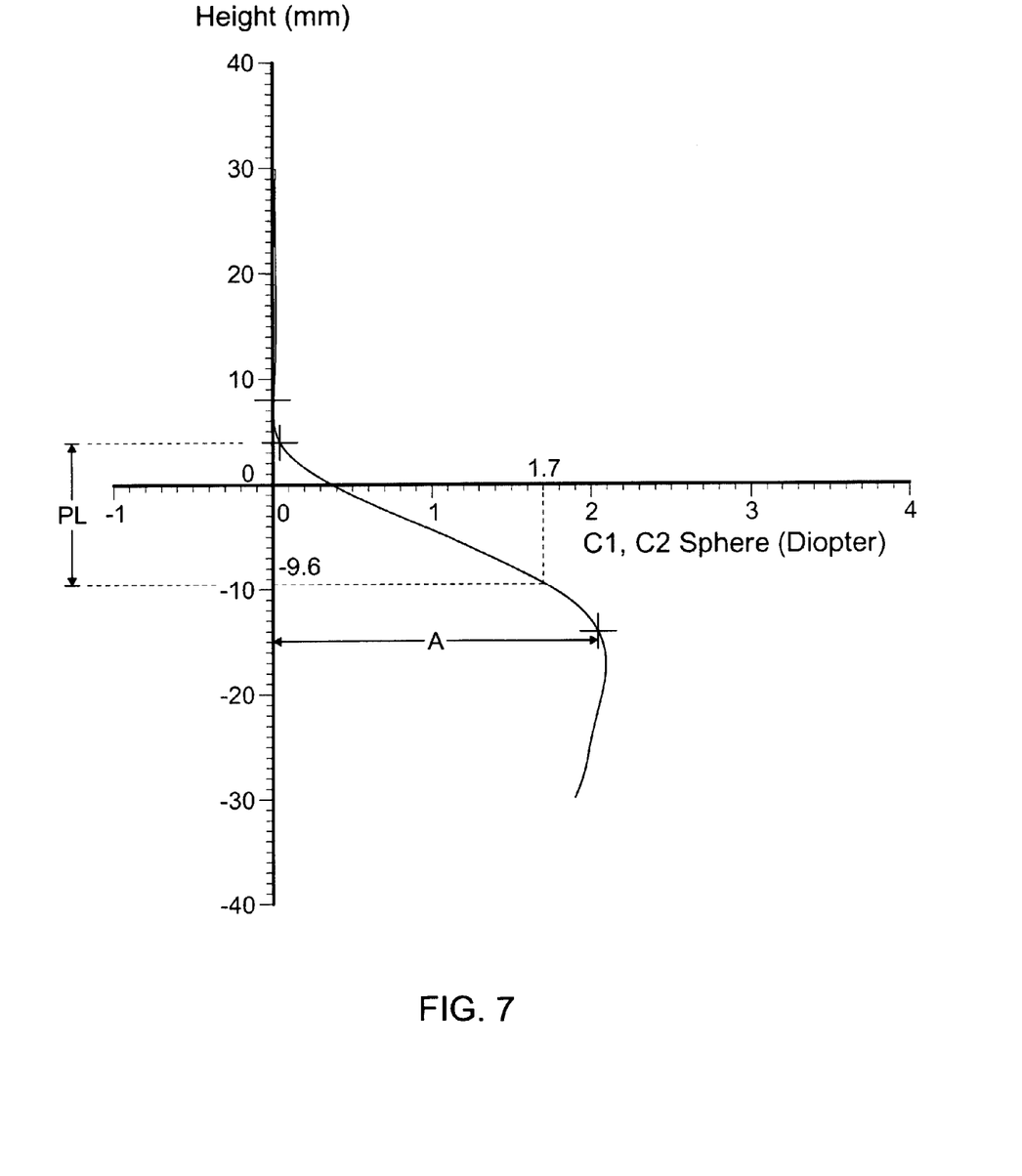
FIGS. 7 to 9, figures similar to FIGS. 1 to 3, for a lens according to a third embodiment of the invention.
Figure 8:
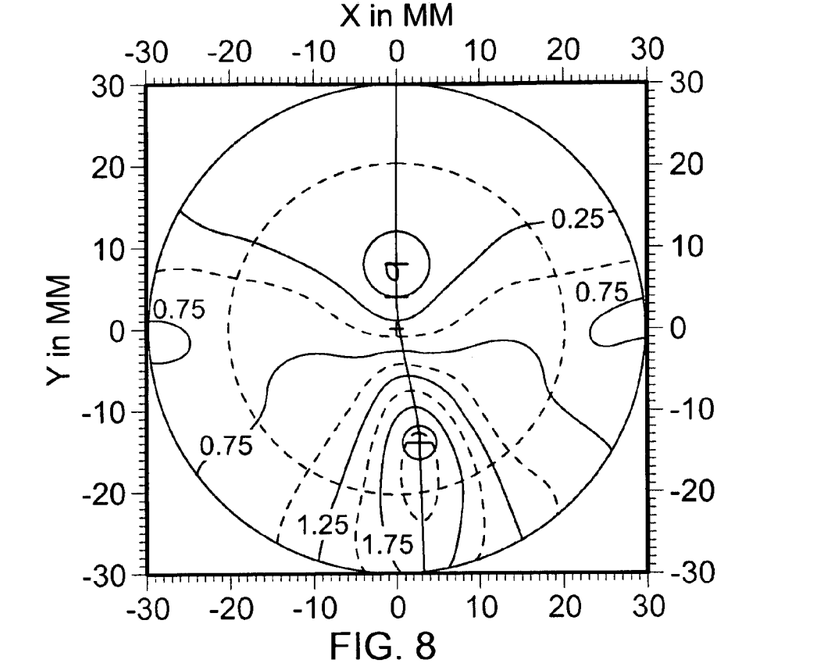
Figure 9:
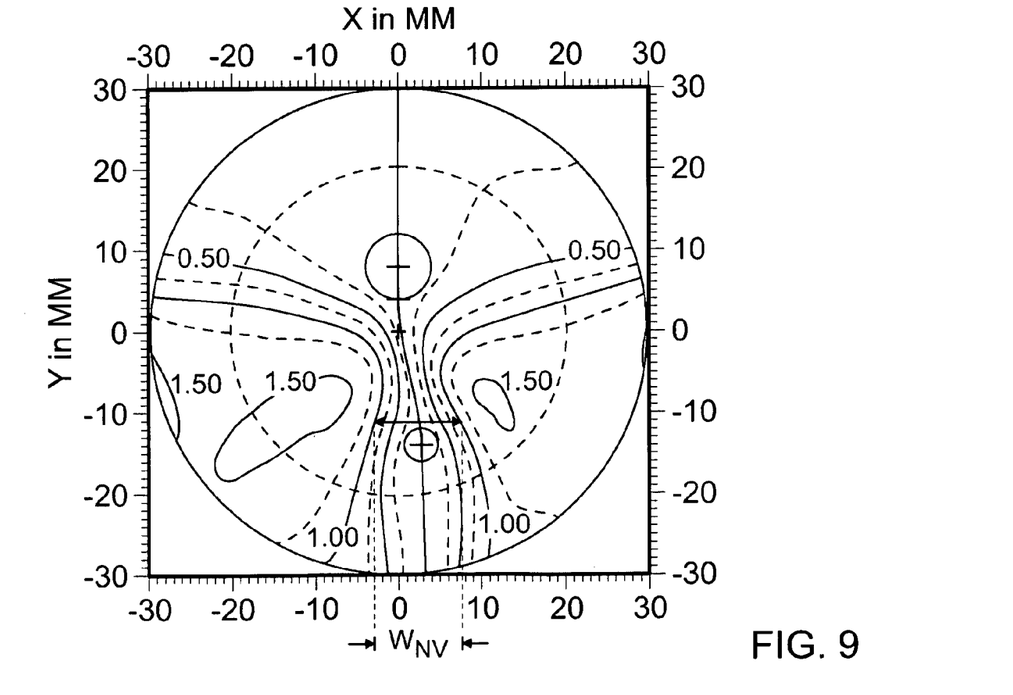

FIGS. 7 to 9 are views similar to those in FIGS. 4 to 6, but without taking any particular account of the wearing conditions.

FIG. 7 shows the characteristics already demonstrated in FIG. 1—except that the mean-sphere progression on the meridian is approximately 2 diopters, not 1.5 diopters. The mean sphere at the origin is 6.57 diopters. The mean sphere variation on the meridian in the upper part of the lens, between the fitting cross FC and the far vision reference point FV, is 0.04 diopters; and the mean sphere variation on the meridian below the near vision reference point NV decreases slightly.

FIG. 7 also shows the progression length PL. In the example in FIG. 7, applying the definition given with reference to FIG. 1, a mean sphere of 0.85×2 diopters, i.e. of 1.70 diopters is obtained for an ordinate point y of approximately −9.6 mm. The progression length PL, between the fitting cross FC of ordinate y=4 mm and that point on the meridian where the mean sphere reaches 85% of the addition, is equal to 13.6 mm. The accessibility to the powers required in near vision is therefore less than 14 mm. Moreover, in the example in FIG. 7, applying the definition given with reference to FIG. 1, the maximum slope of the sphere variation normalized to the addition is equal to 0.078 mm$^{-1}$; it is therefore greater than 0.07 mm$^{-1}$.

Figure 15:
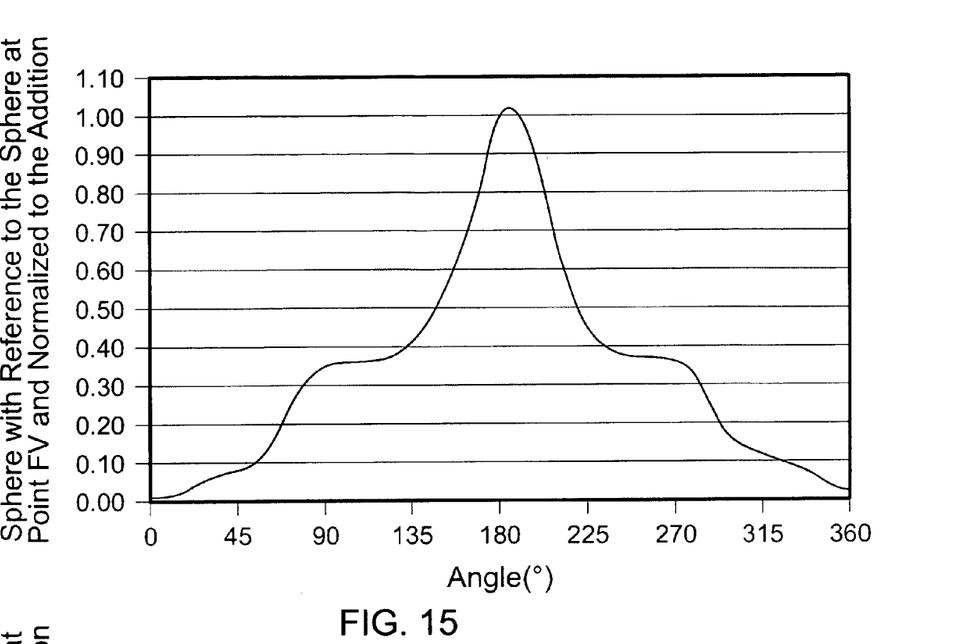

FIG. 8 shows the 0 to 2 diopter isosphere lines, with a step of 0.25 diopters. As in FIG. 2, a circle of radius 20 mm centred on the geometrical centre of the lens is represented. The rebound of the sphere value variation along this circle, divided by the value of the addition A, is less than 0.04. FIG. 15, which will be described below, represents a graph of the sphere variation normalized to the addition along this circle for this lens having a power addition of 2 diopters on the complex surface.

FIG. 9 shows the 0.25 to 1.5 diopter isocylinder lines, with a step of 0.25 diopters. As in FIGS. 3 and 6, it is noted that in the lower part of the lens, the isocylinder lines are virtually parallel and vertical and delimit a zone containing the near vision reference point NV. The near vision width $W_{NV}$ has also been represented in FIG. 9: according to the definitions given with reference to FIG. 3, the near vision width $W_{NV}$ is 12.6 mm and the relative near vision width $RW_{NV}$ is 16.65 mm.

Also represented is the circle of radius 20 mm centred on the geometrical centre (0, 0) of the lens, and it is noted that the cylinder value normalized to the addition C/A is less than 0.8 in this circle. A maximum value for the cylinder normalized to the addition is measured as equal to 0.76.

Furthermore, the lens of FIG. 9 also respects the criterion of a ratio of less than 0.14 for the ratio between on the one hand, the integral of the product of the cylinder by the norm of the sphere gradient, on the circle of radius 20 mm centred on the geometrical centre of the lens, and on the other hand, the product of the area of this circle by the addition and by the maximum value of the norm of the sphere gradient on the part of the meridian comprised within this circle. For the lens of FIG. 9, this criterion is 0.12.

FIGS. 10 to 12 are views similar to those of FIGS. 1 to 3, but for a lens with a power addition of 2.5 diopters on the complex surface.

FIG. 10 shows the characteristics already demonstrated in FIG. 1—with the exception that the mean-sphere progression on the meridian is approximately 2.5 diopters and not 1.5 diopters. The mean sphere at the origin is 6.55 diopters. The mean-sphere variation on the meridian in the upper part of the lens, between the fitting cross FC and the far vision reference point FV, is 0.05 diopters; and the mean-sphere variation on the meridian below the near vision reference point decreases slightly.

FIG. 10 also shows the progression length PL. In the example of FIG. 7, by applying the definition given with reference to FIG. 1, a mean sphere of 0.85×2.5 diopters, i.e. of 2.125 diopters is obtained for an ordinate point y of approximately −9.6 mm. The progression length PL, between the fitting cross FC of ordinate y=4 mm and that point on the meridian where the mean sphere reaches 85% of the addition, is equal to 13.6 mm. The accessibility to the powers required in near vision is therefore less than 14 mm. Moreover, in the example of FIG. 7, applying the definition given with reference to FIG. 1, the maximum sphere-variation slope normalized to the addition is equal to 0.078 mm$^{-1}$; it is therefore greater than 0.07 mm$^{-1}$.

Figure 16:
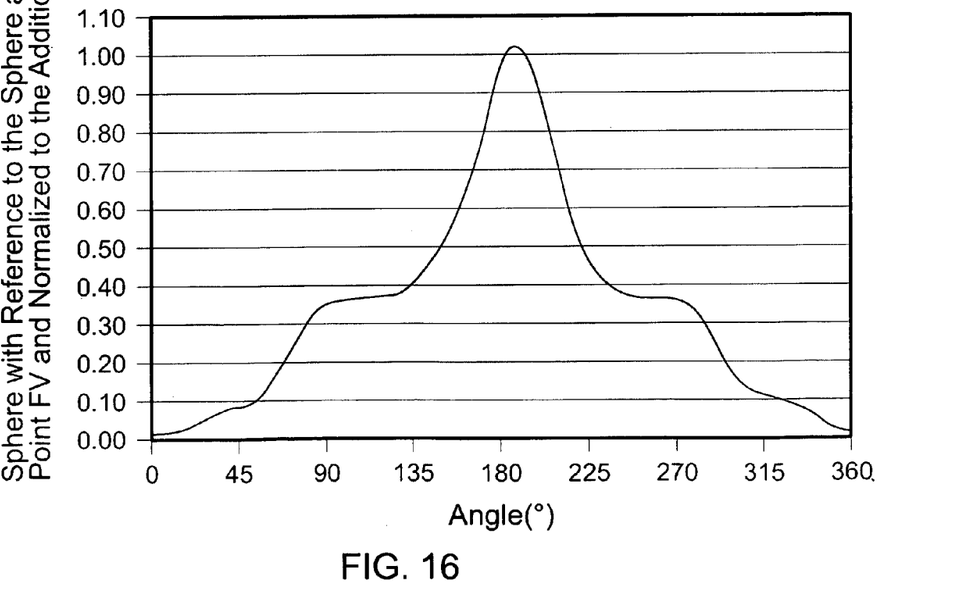

FIG. 11 shows the 0 to 2.5 diopter isosphere lines, with a step of 0.25 diopter. As in FIG. 2, a circle of radius 20 mm centred on the geometrical centre of the lens is shown. The rebound of the sphere-value variation along this circle, divided by the value of the addition A, is less than 0.04. FIG. 16, which will be described below, represents a graph of the sphere variation normalized to the addition along this circle for this lens having a power addition of 2.5 diopters on the complex surface.

FIG. 12 shows the 0.25 to 1.75 diopter isocylinder lines, with a step of 0.25 diopters. As in FIGS. 3, 6 and 9, it is noted that in the lower part of the lens, the isocylinder lines are virtually parallel and vertical and delimit a zone containing the near vision reference point NV. The near vision width $W_{NV}$ has also been shown in FIG. 12: according to the definitions given with reference to FIG. 3, the near vision width $W_{NV}$ is equal to 12.61 mm and the relative near vision width $RW_{NV}$ is equal to 16.64 mm.

The circle of radius 20 mm centred at the geometrical centre (0, 0) of the lens is also shown, and it is noted that the cylinder value normalized to the addition C/A is less than 0.8 within this circle. A maximum cylinder value normalized to the addition equal to 0.76 is measured.

Furthermore, the lens of FIG. 12 also respects the criterion of a ratio of less than 0.14 for the ratio between, on the one hand, the integral of the product of the cylinder by the norm of gradient of the sphere, on the circle of radius 20 mm centred on the geometrical centre of the lens, and on the other hand, the product of the area of this circle by the addition and by the maximum value of the norm of the sphere gradient on the part of the meridian comprised within this circle. For the lens of FIG. 12, the value of this ratio is 0.12.

FIGS. 13 to 16 show the mean-sphere variation on the circle of diameter 40 mm centred on the geometrical centre of the lens, for the different lenses described above. The ordinates are graduated without units because the values are expressed in sphere values (diopters) normalized to the addition (diopters). The abscissas represent the angle θ in a system of polar coordinates the centre of which is the geometrical centre of the lens and the angles of which are measured from the upward-directed vertical half-line.

FIGS. 13 to 16 show that the value of the sphere increases when moving on the circle from a point of intersection of the circle with the meridian to the other point of intersection of the circle with the meridian to reach an absolute maximum, then the value of the sphere reduces when moving on the circle in order to return to the first point of intersection of the circle with the meridian to define an absolute minimum.

The absolute maximum of the sphere normalized to the addition is obtained for the point of intersection of the circle with the meridian in the lower part of the lens (near vision zone). Each graph of the sphere variation normalized to the addition has two rebounds on each side of the absolute maximum. Each rebound constitutes a break in the monotone variation of the sphere. However, according to the invention, the evolution of the sphere on the circle of radius 20 mm centred on the geometrical centre of the lens has rebounds of very low amplitude when moving on the circle from a point of intersection of the circle with the meridian towards the other point of intersection of the circle with the meridian; this low rebound of the sphere on the circle on each side of the meridian ensures a gentle and uniform variation in the optical characteristics of the lens, and ensures easier adaptation by the wearer to the lenses.

FIG. 14 shows that the largest rebound, while remaining relatively low, appears on the graph corresponding to the lens of FIGS. 3 to 6. In this example, the constraints imposed on the lens are different, on the one hand to introduce construction cylinder in order to compensate for optical aberrations noticed in wearing conditions, and on the other hand to favour the near vision widths ($W_{NV}$ and $RW_{NV}$). The compromise between the width of the near vision zone and the peripheral vision was here chosen more in favour of the near vision to the detriment of peripheral sphere variations.

The summary table below gives the characteristic values of the lenses according to the invention for different addition values.

The table shows the following for different addition values: the progression length PL; the maximum slope $S_{max}$ of the sphere variation normalized to the addition on the meridian; the maximum rebound of the sphere quantity normalized to the addition on the circle of radius 20 mm centred on the geometrical centre of the lens; the maximum cylinder $C_{max}$ normalized to the addition in the said circle; the mean sphere difference on the meridian between the fitting cross of the lens and the far vision control point ($Sph_{FC}$-$Sph_{FV}$); the width of the near vision zone $W_{NV}$; the normalized width of the near vision zone $RW_{NV}$; and the ratio R between, on the one hand, the integral of the product of the cylinder by the norm of the sphere gradient on the circle of radius 20 mm centred on the geometrical centre of the lens, and on the other hand, the product of the area of this circle by the addition and by the maximum value of the norm of the sphere gradient on the part of the meridian comprised within this circle.

and a minimized sphere rebound normalized to the addition on the circle of diameter 40 mm centred on the lens.

The lens according to the invention is prescribed taking into account the far vision and near vision wearer prescriptions which determines the addition required. The necessary power can be obtained, as in the state of the art, by machining a rear face in order to ensure that the power is identical to the prescribed power.

The fitting of the lens in a visual device can take place in the following manner. The horizontal position of the pupil of the wearer in far vision is measured, i.e. just the interpupillary half-distance, and the overall height of the size of the frame of the visual device is determined. The lens is then fitted in the visual device with the fitting cross positioned in the measured position.

Reference can be made to the patent application FR-A-2 807 169 describing a simplified method for fitting ophthalmic lenses in a frame. This document in particular describes the different measurements taken by opticians and proposes to measure only the interpupillary half-distance in order to carry out the fitting of the lenses in the frame using the overall height of the size of the frame.

The fitting of the lens therefore requires only a standard measurement of the half interpupillary distance in far vision, as well as a measurement of the height of the size of the frame, in order to determine the height at which the fitting cross must be placed in the frame. The fitting of the lens in the frame takes place simply by measuring the position in the frame of the subject's viewing in far vision; this measurement takes place in a standard manner, with the subject wearing the frame and looking into the distance. The lens is then cut out and is mounted in the frame, so that the fitting cross is in the measured position.

The lens according to the invention allows an improved tolerance for the fitting described above. This tolerance is provided by a sphere value which is more or less constant around the fitting cross. In particular, the difference in the mean sphere on the meridian between the fitting cross of the lens and the far vision control point is less than 0.06 diopters.

The lens of the examples described above can be obtained by optimization of a surface according to the optimization methods known per se and described in the documents of the state of the art mentioned above in relation to progressive multifocal lenses. For the optimization it is possible to use one or more of the criteria described in the above description with reference to FIGS. 1 to 16, and in particular:

| Add (D.) | PL (mm) | $S_{max}$ (mm$^{-1}$) | Rebound normalized | $C_{max}$ (normalized) | $Sph_{FC}$ − $Sph_{FV}$ (D) | $W_{NV}$ (mm) | $RW_{NV}$ (mm) | R |
|---|---|---|---|---|---|---|---|---|
| 1.50 | 13.5 | 0.084 | 0.002 | 0.78 | 0.02 | 13.11 | 17.12 | 0.11 |
| 2.00 A | 13.6 | 0.082 | 0.030 | 0.78 | 0.04 | 13.02 | 17.72 | 0.12 |
| 2.00 B | 13.6 | 0.078 | 0.001 | 0.76 | 0.04 | 12.60 | 16.65 | 0.12 |
| 2.50 | 13.6 | 0.078 | 0.001 | 0.76 | 0.05 | 12.61 | 16.64 | 0.12 |

FIGS. 1 to 16 illustrate four embodiments of lenses according to the invention. These figures clearly show that the lens offers good accessibility to the power values required for near vision; the near vision zone being accessible from 14 mm below the fitting cross, and an improved comfort of vision in the peripheral zones on either side of the meridian, with a cylinder maximum normalized in the useful zone of the lens a mean-sphere progression on the meridian of 1.5 diopters or more;

a progression length less than or equal to 14 mm.

a cylinder value normalized to the addition of less than 0.8 in a circle of radius 20 mm centred on the geometrical centre of the lens;

a rebound of the sphere quantity normalized to the addition on this circle of less than 0.04;

These criteria can be combined with others, in particular with one or more of the criteria proposed in the above examples. One or more of the following criteria can also be used:

- a mean sphere difference on the meridian, between the fitting cross of the lens and the far vision reference point, less than or equal to 0.06 diopters;
- a maximum slope of sphere variation normalized to the addition on the meridian of progression greater than 0.07 mm$^{-1}$;
- a near vision width comprised between 11 mm and 15 mm;
- a defined relative near vision width greater than 15 mm;
- a ratio between, on the one hand, the integral of the product of the cylinder by the norm of the sphere gradient on the circle of radius 20 mm centred on the geometrical centre of the lens and, on the other hand, the product of the area of this circle by the addition and by the maximum value of the norm of the sphere gradient on the part of the meridian comprised within this circle, of less than 0.14.

The choice of these criteria makes it possible to obtain a lens by optimization. A person skilled in the art easily understands that the lens in question does not necessarily have values corresponding exactly to the criteria imposed; for example, it is not essential for the upper value of the mean-sphere variation to be reached.

In the above optimization examples, it was proposed to optimize only one of the faces of the lenses. It is clear that in all these examples the role of the front and rear surfaces can be easily switched. The sphere progression can also equally well be allocated to either of the two surfaces of the lens, or partially to one face and the other, as soon as optical targets similar to those of the lens described above are reached.

What is claimed is:

1. An ophthalmic lens having a complex surface with a geometrical centre, a fitting cross situated 4 mm above the geometrical centre and a substantially umbilical progression meridian having a power addition greater than or equal to 1.5 diopters between a far vision reference point and a near vision reference point, the complex surface having:
    a cylinder value normalized to the addition of less than 0.8 in a circle of radius 20 mm centred on the geometrical centre of the lens;
    a rebound in the sphere quantity normalized to the addition on the circle of radius 20 mm centred on the geometrical centre of the lens of less than 0.04;
    a progression length less than or equal to 14 mm, the progression length being defined as the vertical distance between the fitting cross and the point on the meridian at which the mean sphere reaches 85% of the progression of the addition.

2. The lens of claim 1, characterized in that the mean-sphere difference on the meridian, between the fitting cross of the lens and the far vision reference point, is less than or equal to 0.06 diopters.

3. The lens of claim 1 or 2, characterized in that the progression meridian has a maximum slope of the sphere variation normalized to the addition greater than 0.07 mm$^{-1}$.

4. The lens of claim 1, characterized in that the complex surface has, at the near vision reference point, a near vision zone width comprised between 11 mm and 15 mm, the width of the near vision zone being defined as the distance, on a horizontal line 18 mm below the fitting cross, between the isocylinder lines equal to half of the addition.

5. The lens of claim 4, characterized in that the complex surface has, at the near vision reference point, a relative width of the defined vision zone greater than 15 mm, the relative width of the near vision zone being defined by the ratio:

$RW_{NV} = W_{NV} \cdot (A_{NV}/C_{NV})$;

with $W_{NV}$, the near vision zone width, with $A_{NV}$, the near vision addition, being defined as the difference between the mean sphere on the principal progression meridian at the near vision reference point and the mean sphere at the fitting cross; and with $C_{NV}$ the maximum cylinder on a horizontal segment passing through the near vision reference point and enclosed by the circle of radius 20 mm centred on the geometrical centre of the lens.

6. The lens of claim 1, characterized in that the complex surface has a ratio between:
    the integral of the product of the cylinder by the norm of the sphere gradient on the circle of radius 20 mm centred on the geometrical centre of the lens, on the one hand, and
    the product of the area of the circle by the addition and by the maximum value of the norm of the sphere gradient on the part of the meridian comprised within this circle, on the other hand,
    being less than 0.14.

7. A visual device comprising at least one ophthalmic lens having a complex surface with a geometrical centre, a fitting cross situated 4 mm above the geometrical centre and a substantially umbilical progression meridian having a power addition greater than or equal to 1.5 diopters between a far vision reference point and a near vision reference point, the complex surface having:
    a cylinder value normalized to the addition of less than 0.8 in a circle of radius 20 mm centred on the geometrical centre of the lens;
    a rebound in the sphere quantity normalized to the addition on the circle of radius 20 mm centred on the geometrical centre of the lens of less than 0.04;
    a progression length less than or equal to 14 mm, the progression length being defined as the vertical distance between the fitting cross and the point on the meridian at which the mean sphere reaches 85% of the progression of the addition.

8. A method for correcting the vision of a presbyopic subject, which comprises providing the subject with, or the wearing by the subject of, a visual device comprising at least one ophthalmic lens having a complex surface with a geometrical centre, a fitting cross situated 4 mm above the geometrical centre and a substantially umbilical progression meridian having a power addition greater than or equal to 1.5 diopters between a far vision reference point and a near vision reference point, the complex surface having:
    a cylinder value normalized to the addition of less than 0.8 in a circle of radius 20 mm centred on the geometrical centre of the lens;
    a rebound in the sphere quantity normalized to the addition on the circle of radius 20 mm centred on the geometrical centre of the lens of less than 0.04;
    a progression length less than or equal to 14 mm, the progression length being defined as the vertical distance between the fitting cross and the point on the meridian at which the mean sphere reaches 85% of the progression of the addition.

9. A method for fitting an ophtalmic lens in a visual device, the lens having a complex surface with a geometrical centre, a fitting cross situated 4 mm above the geometrical centre and a substantially umbilical progression meridian having a power addition greater than or equal to 1.5 diopters between a far vision reference point and a near vision reference point, the complex surface having:
- a cylinder value normalized to the addition of less than 0.8 in a circle of radius 20 mm centred on the geometrical centre of the lens;
- a rebound in the sphere quantity normalized to the addition on the circle of radius 20 mm centred on the geometrical centre of the lens of less than 0.04;
- a progression length less than or equal to 14 mm, the progression length being defined as the vertical distance between the fitting cross and the point on the meridian at which the mean sphere reaches 85% of the progression of the addition;

the method comprising:
- measurement of the horizontal position of the wearer's pupil in far vision;
- determination of the overall height of the frame size of the visual device;
- fitting of a lens in the device, with the fitting cross in the measured position.

* * * * *